(No Model.)
P. A. WHITNEY.
CLAMP.
No. 385,983. Patented July 10, 1888.
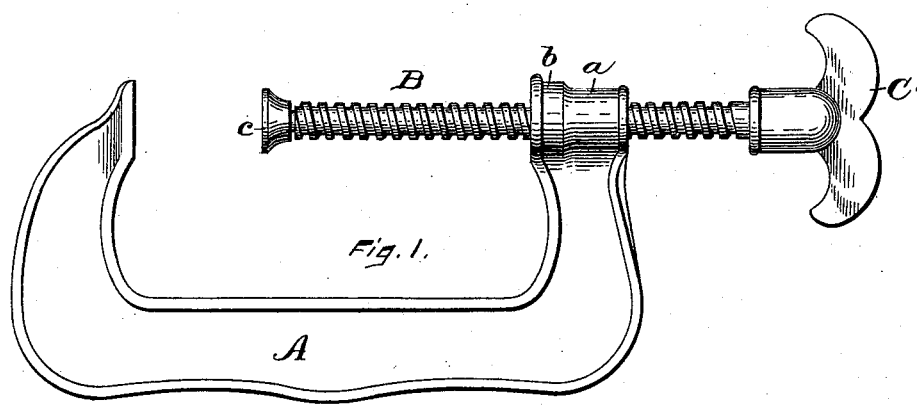
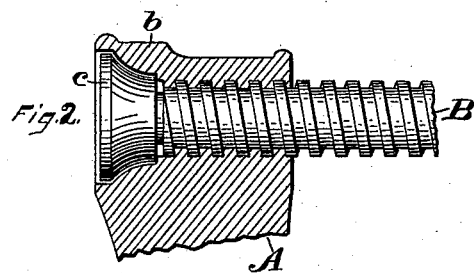
Witnesses.
John Edwards Jr.
W. H. Whiting.
Inventor.
Pardon A. Whitney.
By James Shepard Atty.

UNITED STATES PATENT OFFICE.

PARDON A. WHITNEY, OF SOUTHINGTON, CONNECTICUT, ASSIGNOR TO THE PECK, STOW & WILCOX COMPANY, OF SAME PLACE.

CLAMP.

SPECIFICATION forming part of Letters Patent No. 385,983, dated July 10, 1888.

Application filed March 8, 1888. Serial No. 266,543. (No model.)

*To all whom it may concern:*

Be it known that I, PARDON A. WHITNEY, a citizen of the United States, residing at Southington, in the county of Hartford and State of Connecticut, have invented certain new and useful Improvements in Clamps, of which the following is a specification.

My invention relates to improvements in clamps; and the object of my invention is to increase the capacity of the clamp for grasping articles of a certain size without increasing the bulk of the clamp or impairing its strength.

In the accompanying drawings, Figure 1 is a side elevation of my clamp. Fig. 2 is an enlarged section of the head of said clamp, showing, also, the tail end of the screw in side elevation.

A designates the body of the clamp, the head $a$ of which is threaded for a part of its length to receive the clamp-screw B, while upon the inner end of said head, below the threaded portion, there is a socket, $b$, the opening in which is in alignment with the opening or threaded hole for the screw. At the tail end of the screw there is an ordinary swivel plate or bushing, $c$, and the socket $b$ in the inner end of the clamp-head $a$ is of a form and size which will receive into it the whole of said swivel plate or bushing $c$, as shown in Fig. 2. Outside of the socket, or at the junction of the body of the clamp and its head $a$, said body is of full width, whereby the clamp is as strong as if there were no socket formed within its head. This construction enables me to utilize all the space between the two arms of the clamp without impairing the holding strength of the clamp or increasing its bulk. The screw B is provided with a head, C.

I claim as my invention—

The herein-described clamp, consisting of the body A, having the head $a$, through which the screw passes, provided with an internal screw-thread and an open socket at its inner end below the threaded portion, and the screw B, having the swivel plate or bushing $c$, of a size and form adapted to be received within the socket of the head $a$, substantially as described, and for the purpose specified.

PARDON A. WHITNEY.

Witnesses:
  STEPHEN WALKLEY,
  J. BOND.